US00RE44772E

(19) United States
(12) Reissued Patent
Wark

(10) Patent Number: US RE44,772 E
(45) Date of Reissued Patent: Feb. 25, 2014

(54) COAL PULVERIZER/CLASSIFIER DEFLECTOR

(71) Applicant: Rickey E. Wark, Spring, TX (US)

(72) Inventor: Rickey E. Wark, Spring, TX (US)

(21) Appl. No.: 13/804,842

(22) Filed: Mar. 14, 2013

Related U.S. Patent Documents

Reissue of:
(64) Patent No.: 8,308,093
Issued: Nov. 13, 2012
Appl. No.: 12/685,175
Filed: Jan. 11, 2010

(51) Int. Cl.
*B02C 15/00* (2006.01)

(52) U.S. Cl.
USPC ..... 241/119

(58) Field of Classification Search
USPC ..... 241/117–121
See application file for complete search history.

(56) References Cited

U.S. PATENT DOCUMENTS

| | | | | |
|---|---|---|---|---|
| 2,566,103 | A * | 8/1951 | Weston | 241/181 |
| 4,270,705 | A * | 6/1981 | Larsen | 241/183 |
| 4,907,751 | A | 3/1990 | Wark et al. | |
| 5,090,631 | A | 2/1992 | Wark | |
| 7,100,853 | B2 * | 9/2006 | Wark | 241/119 |
| 7,373,778 | B2 * | 5/2008 | Bunker et al. | 60/752 |
| 2011/0114769 | A1 | 5/2011 | Wark | |

* cited by examiner

*Primary Examiner* — Faye Francis
(74) *Attorney, Agent, or Firm* — Young Basile Hanlon & MacFarlane PC

(57) ABSTRACT

An improved deflector structure for an updraft classifier mill for coal and ore is described. The improved deflector structure has an impingement surface which is characterized by a pattern of surface irregularities, either raised geometric figures or recesses of varying sizes and shapes to create turbulence in the air emerging from a rotating vane structure and impinging the deflector as it travels upwardly through the mill housing.

16 Claims, 6 Drawing Sheets

COAL PULVERIZER/CLASSIFIER DEFLECTOR

Matter enclosed in heavy brackets [ ] appears in the original patent but forms no part of this reissue specification; matter printed in italics indicates the additions made by reissue.

FIELD OF THE INVENTION

This invention relates to pulverizing mills for coal and ore and more particularly to an improved deflector structure for use in an updraft mill.

BACKGROUND OF THE INVENTION

Pulverizing mills are commonly used to crush ore and coal for various purposes. One such purpose is to crush coal into fine particles for use as fuel to fire a boiler for a generator turbine. One type of pulverizing mill comprises a milling bowl which can be rotated about a vertical axis, a chute for dropping lump coal or ore onto the milling bowl and an annular vane structure attached to the outer periphery of the milling bowl for rotation therewith. Air is forced to flow upwardly through the vane structure toward the top of the pulverizing mill housing where a classifier structure separates the particles according to size and admits the smaller particles to a system of conduits which extend to a combustion chamber.

Mounted on an interior surface of the mill housing immediately around and above the vane structure is a deflector structure having an inwardly angled surface upon which air passing through the vane structure impinges so as to be deflected back toward the vertical center line of the pulverizing mill as it makes its way upwardly toward the classifier structure. The deflector prevents the abrasive particles from wearing on the walls of the mill housing and speeds up the particle separation process. The rotating vane mill is just one of many mill designs. Other designs use stationary, non-rotating milling bowls and/or stationary, non-rotating vanes. The invention described herein can be used with all such mills.

SUMMARY OF THE INVENTION

The present invention provides an improved deflector for pulverizing mills of the updraft type, wherein the deflector is characterized by a pattern of impingement surface irregularities, such as geometric protrusions, geometric recesses or a combination thereof, which tend to prevent laminar, straight-line flow of airborne particulates thereover and thus create turbulence in the upward flow of the impinging air coming from and through a vane structure. This improves the functions of particle separation and the return of larger, heavier particles to the pulverizing area.

As hereinafter disclosed with reference to one or more illustrative embodiments, the surface irregularities comprise rows of geometric figures such as rectangles which are arranged in such a fashion as to eliminate any straight channels directly through the pattern, particularly in the direction in the flow direction of the impinging air from the vane structure. The term "pattern", as used herein, does not necessarily mean a regular or predictable arrangement of the geometric figures but may include random arrangements so long as they meet the requirement for reducing or eliminating the straight through flow paths or passages between figures to a considerable degree.

In one embodiment, the deflector structures are cast as arcuate segments of an overall annulus which is adapted to be mounted in one or more conventional ways to the interior cylindrical surface of the pulverizing mill outboard of and just above a vane structure. In the illustrated embodiment, the vane structure is mounted on the periphery of the milling bowl but, as stated above, this is not a requirement for the invention. The geometric surface irregularities can be cast into the segments. Alternatively, the deflector structures may be constructed using welded base elements onto which the deflector impingement structures with the aforesaid geometric pattern are attached such as by threaded fasteners and/or welding.

As will be apparent to those of ordinary skill in the pulverizing mill technology, the impingement surface structures are preferably made of a highly wear resistant material because the impingement of solid particles thereon tends to wear the surfaces away over time, requiring replacement thereof. The replacement function necessitates downtime of the pulverizing mill and this is to be minimized for economic reasons.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
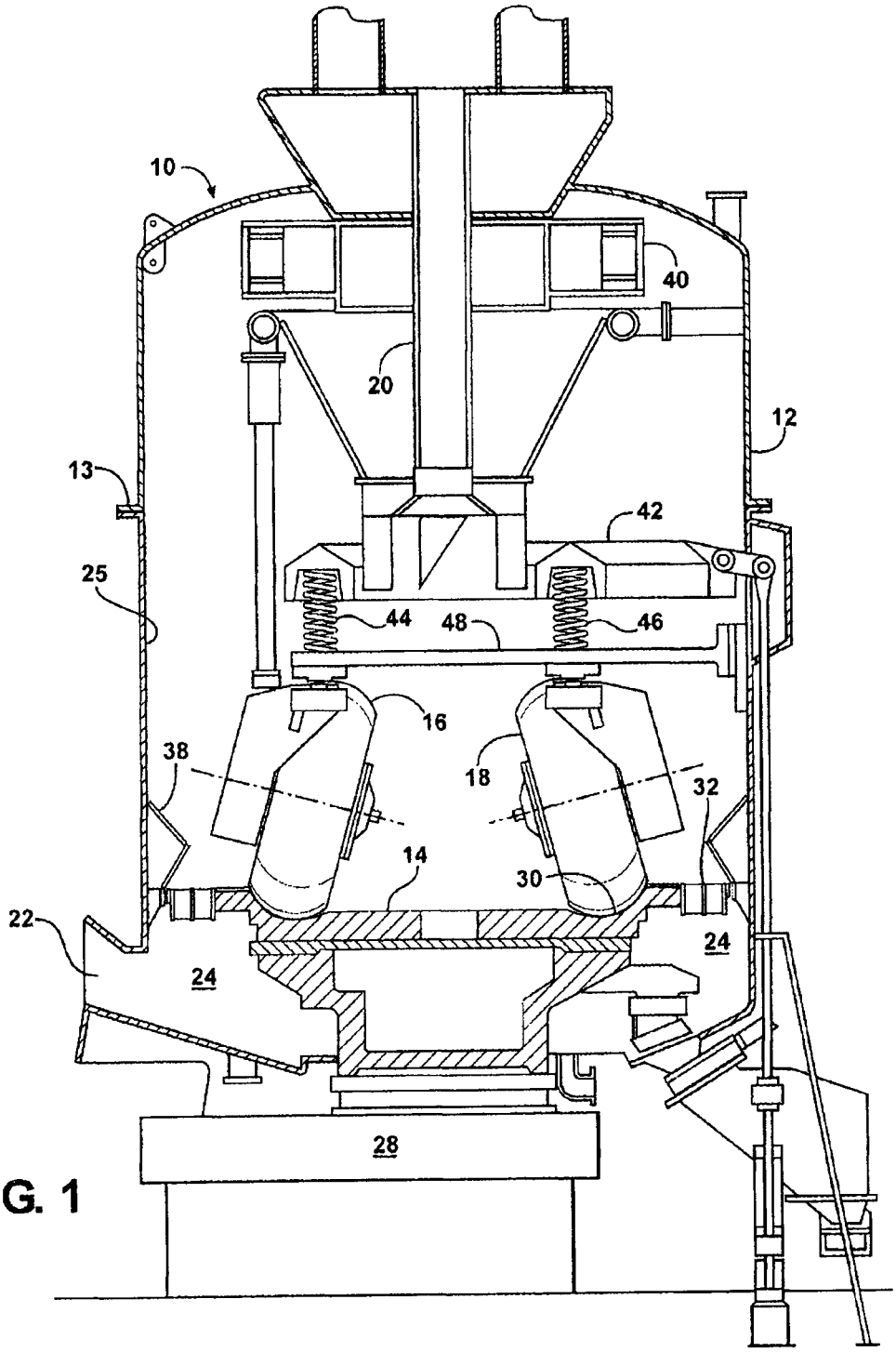
FIG. 1 is a cross-section of a pulverizer/classifier suitable for use of the invention.

FIG. 1 shows in cross-section a coal pulverizing mill which, with the exceptions hereinafter identified, is in widespread use in utility plants for the crushing of lump coal which enters the mill housing through a vertical central chute 20 where it falls onto the surface of a rotating milling bowl 14. The motor driven bowl 14 is engaged by crusher rollers 16, 18 which are suspended by springs 44, 46 from an overhead assembly 42. The assembly 42 is connected to a tensioning mechanism 43 so that the down force of the crusher rollers 16, 18 on the milling bowl 14 can be adjusted.

Figure 2:
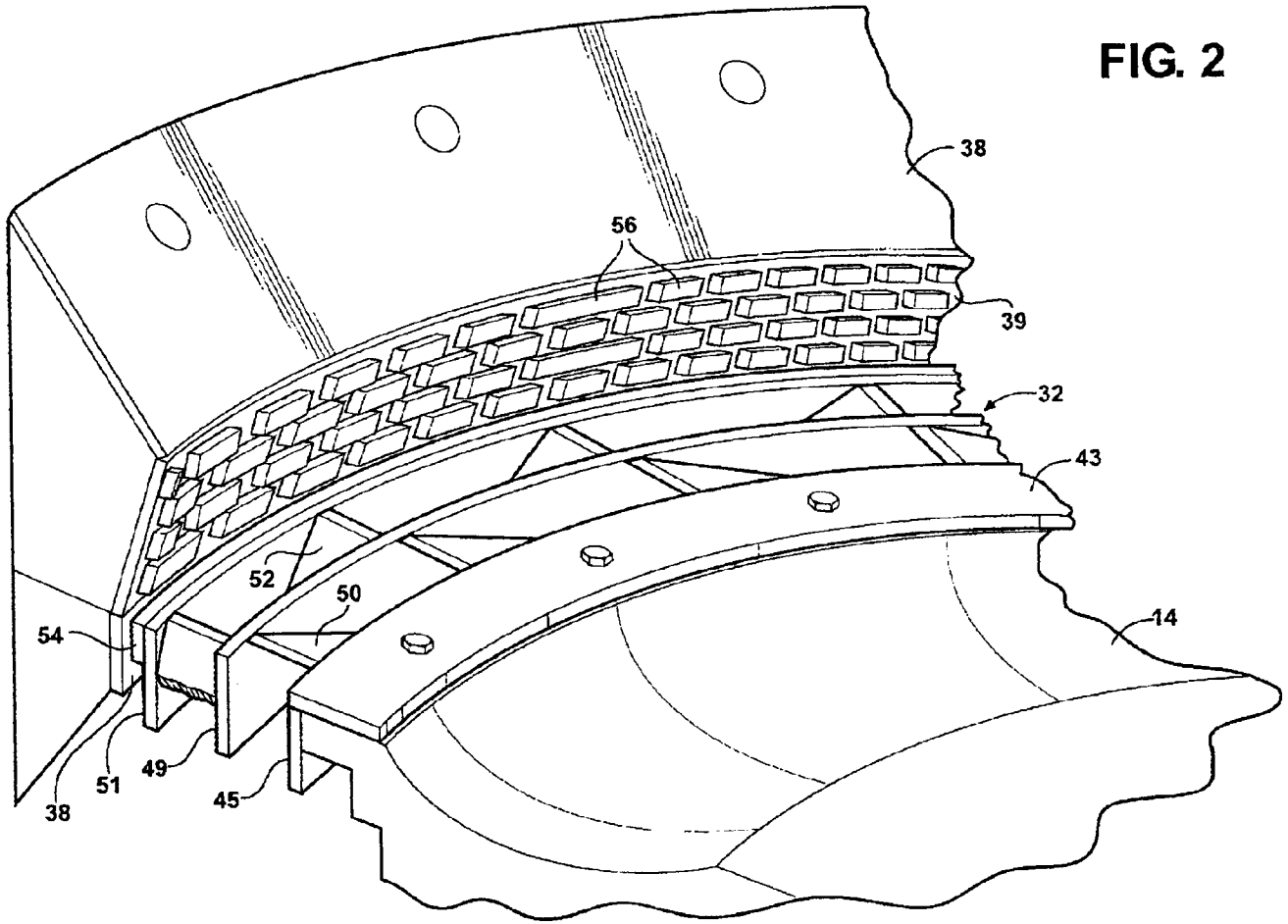
FIG. 2 is a perspective view of a portion of a milling bowl with peripheral vanes and a deflector structure embodying the invention in one form.

Air enters a chamber 24 at the lower end of the pulverizer mill 10 through an inlet 22 and flows upwardly through a proprietary double-course vane structure 32 which is attached to the outer periphery of the milling bowl 14 so as to rotate therewith. The double-course vane structure 32 is a proprietary development of SAS Global, Inc. and is the subject of a pending application for U.S. patent application Ser. No. 12/621,814, filed Nov. 19, 2009. As best shown in FIG. 2, the vane structure 32 comprises two courses of angled vanes 50, 52 which are angled in opposite directions so as to effect the flow direction of air passing through the vane structure 32 and traveling toward the classifier structure 40 in the top of the mill housing 12. A seam 13 joins the upper and lower portions of the mill housing 12 so that the top of the housing can be removed to service and/or install the various components described herein. The vane structure 32 is not shown to scale; i.e., in actual practice, it is generally of smaller radial dimension than what is shown in the figures.

Mounted to the cylindrical interior surface 25 of the lower portion of mill housing 12 is a deflector structure 38 having an impingement surface 39 on which air flowing upwardly through the vane structure 32 impinges so as to be deflected back toward the center of the pulverizing mill 12.

As better shown in FIG. 2, the vane structure 32 comprises an arcuate inner race plate 45, an arcuate middle race plate 49 and an arcuate outer race plate 51, all of the plates 49, 50, 51 being concentric with the milling bowl 14. The inner race plate 45 is welded to a cap plate 43 which can be bolted to the outer top edge of the milling bowl 14 as shown in FIG. 2.

Angled vanes 50 are welded between the races 45, 49 and are oriented at a 45° angle relative to the vertical. Reversely angled plates 52 are welded between the race plates 49, 51 and are oriented at 45° from vertical but in the opposite sense to the vane plates 50. An arcuate seal plate 54 is welded to the outside surface of the outer race 51 to narrow the gap between the outer race plate 51 and the deflector structure 38 so that the majority of the upbound air in the updraft pulverizer mill is forced through the vane structure 32.

Figure 3:
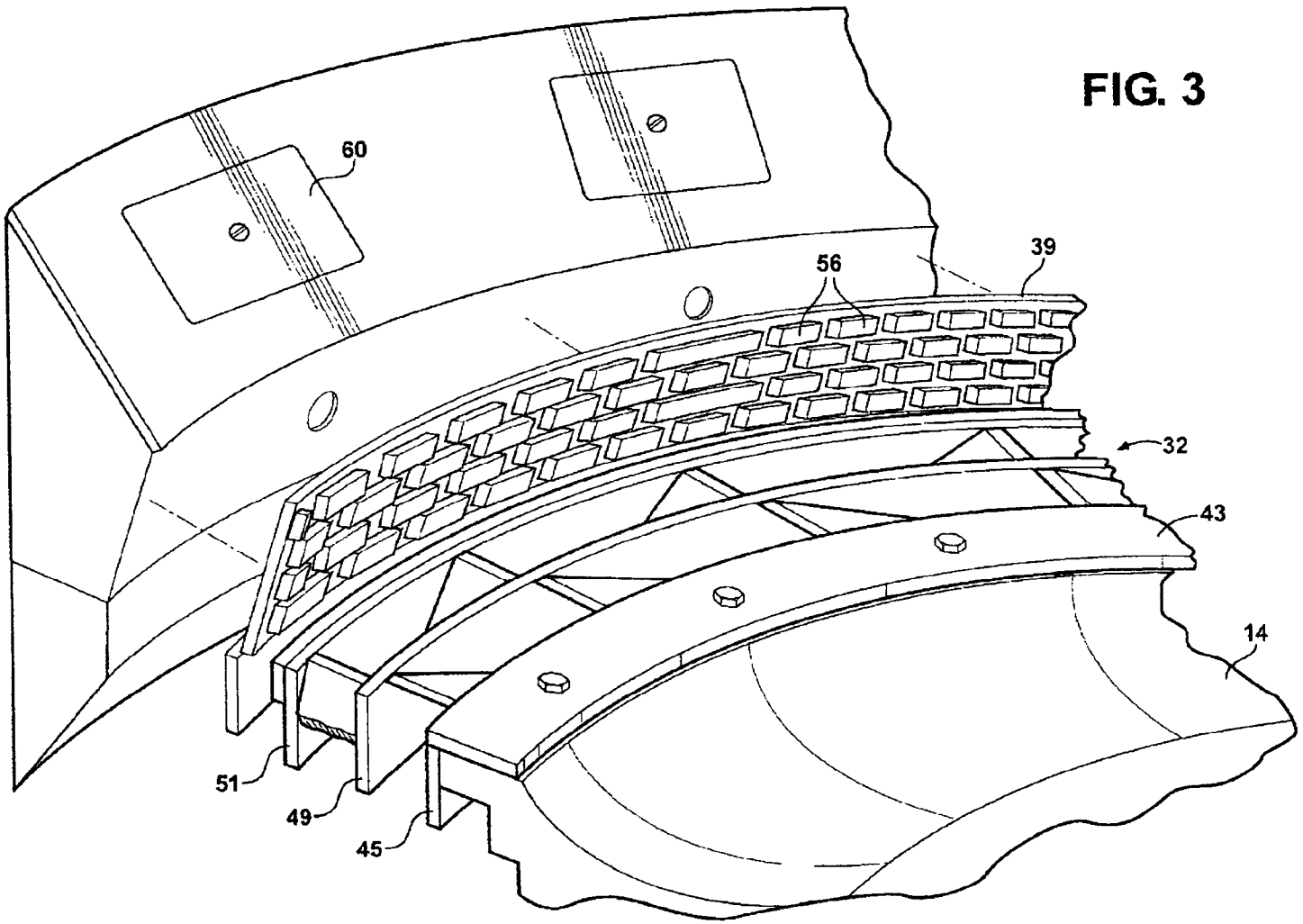
FIG. 3 is a perspective view of a deflector structure similar to FIG. 2 but detached from the mill wall.
Figure 4:
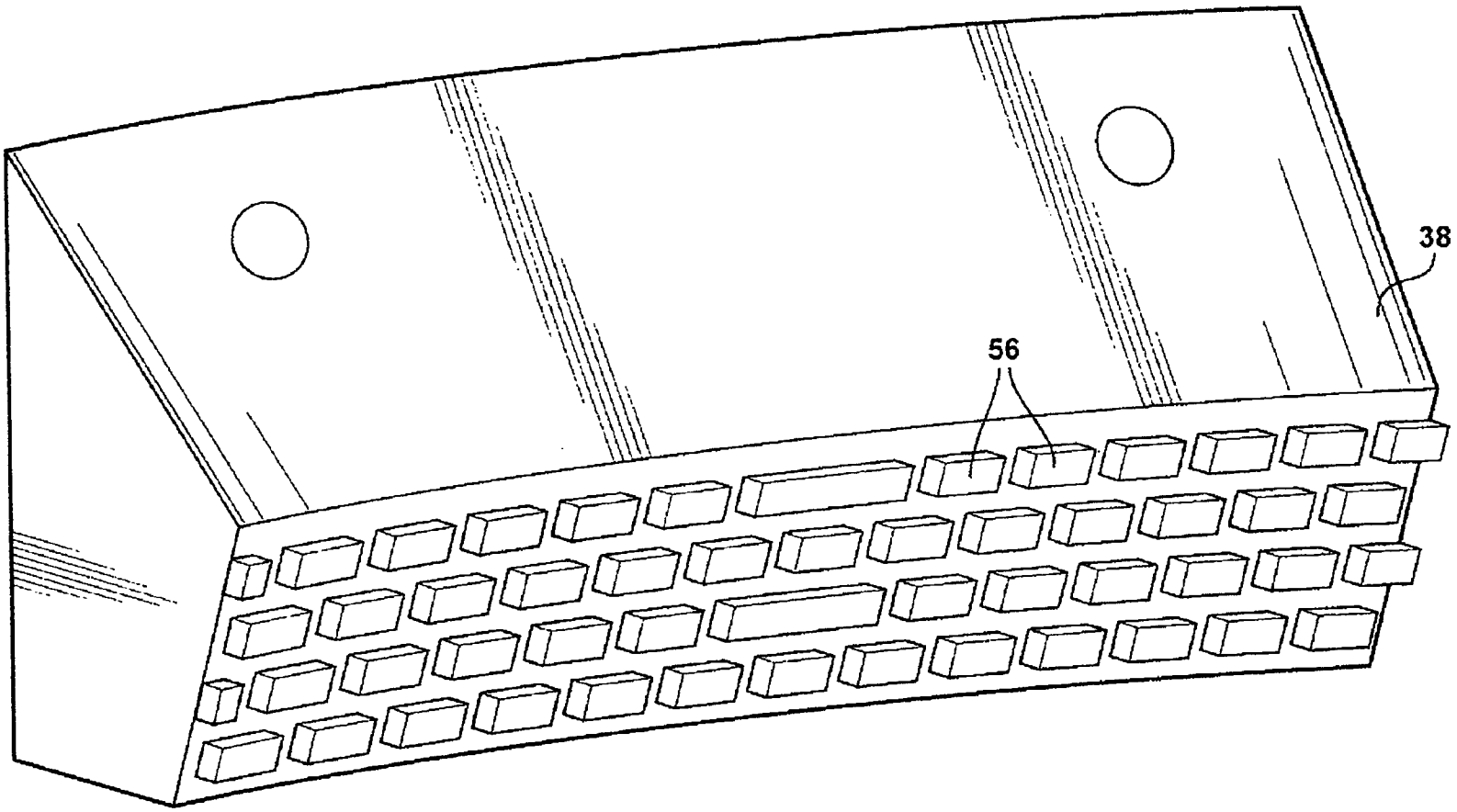
FIG. 4 is a perspective view of a segment of a deflector according to the invention.

FIGS. 2, 3 and 4 also show the deflector structure 38 to comprise, in this example, a large arcuate metal casting which may be made in several arcuate segments and is mounted by fasteners to the interior sidewall 24 of the pulverizing mill. Impingement surface 39 is characterized by multiple rows of raised geometric surface irregularities 56 which are sized and arranged in rows in such a way as to reduce or eliminate any straight-through air paths along the impingement surface 39; i.e., any flow off of the vanes 52 at the 45° angle sees no straight-through path among the surface irregularities 56 but will always encounter an edge surface of one of more of the irregularities 56 which forces a change in direction which results in turbulence in the air flow. This has been found to enhance the function of the pulverizing mill in separating the particles entrained in the upbound air flow according to size; i.e., the larger, heavier particles tend to drop out of the airstream and fall back toward the surface of the milling bowl 14 where they are further pulverized whereas lighter, smaller particles continue traveling upwardly toward the classifier structure 40.

As shown in FIG. 2, the surface irregularities 56 are cast integrally with the entire structure on the impingement circuit 39. They may also be cut from steel stock and welded to the surface 39. The surface irregularities are all, in this illustrative embodiment, generally rectangular in shape but vary in size so as to create the tortuous air flow paths as described above. Rectangular irregularities are but one of many geometric shapes which can be used, for example, circles and other polyhedrons can be used to create the turbulent air flow described above, but rectangles and squares are preferred.

Figure 5:
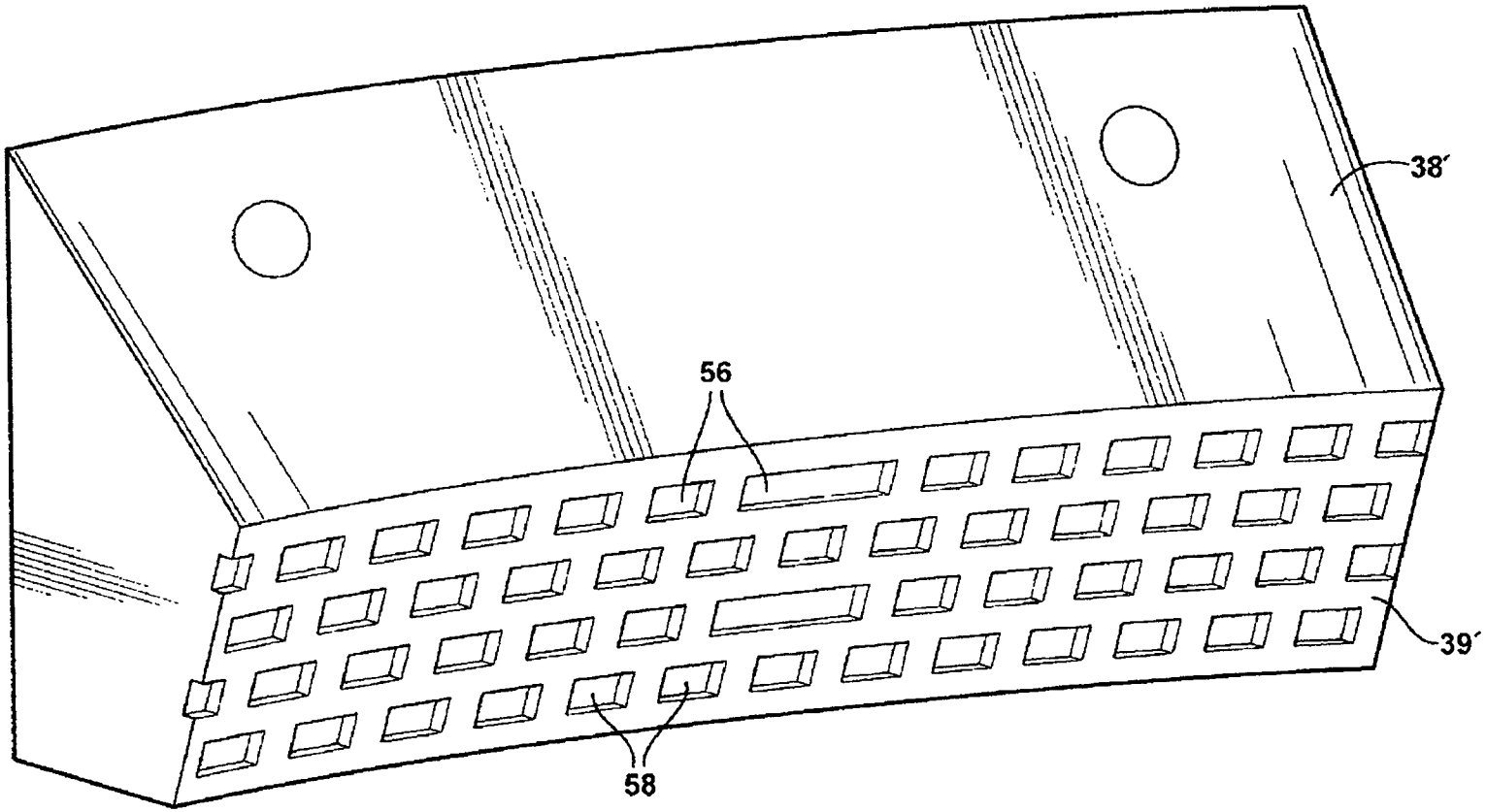
FIG. 5 is a perspective view of an arcuate deflector segment in which the surface irregularities are depressions rather than raised figures.

FIG. 5 shows another approach wherein the surface irregularities are created in the form of cast-in recesses 58 in the impingement surface 39' of the structure 38'. The effect is essentially the same and the structure 38' can be installed in the same manner as the structure 38. Specifically, the structures 38 and 38' are typically manufactured in arcuate segments and are fastened in place with the threaded fasteners hereinafter described until the entire annular structure required to completely circumscribe the vane structure 32 is created. As stated above, the top of the mill may be removed for this operation.

Figure 6:
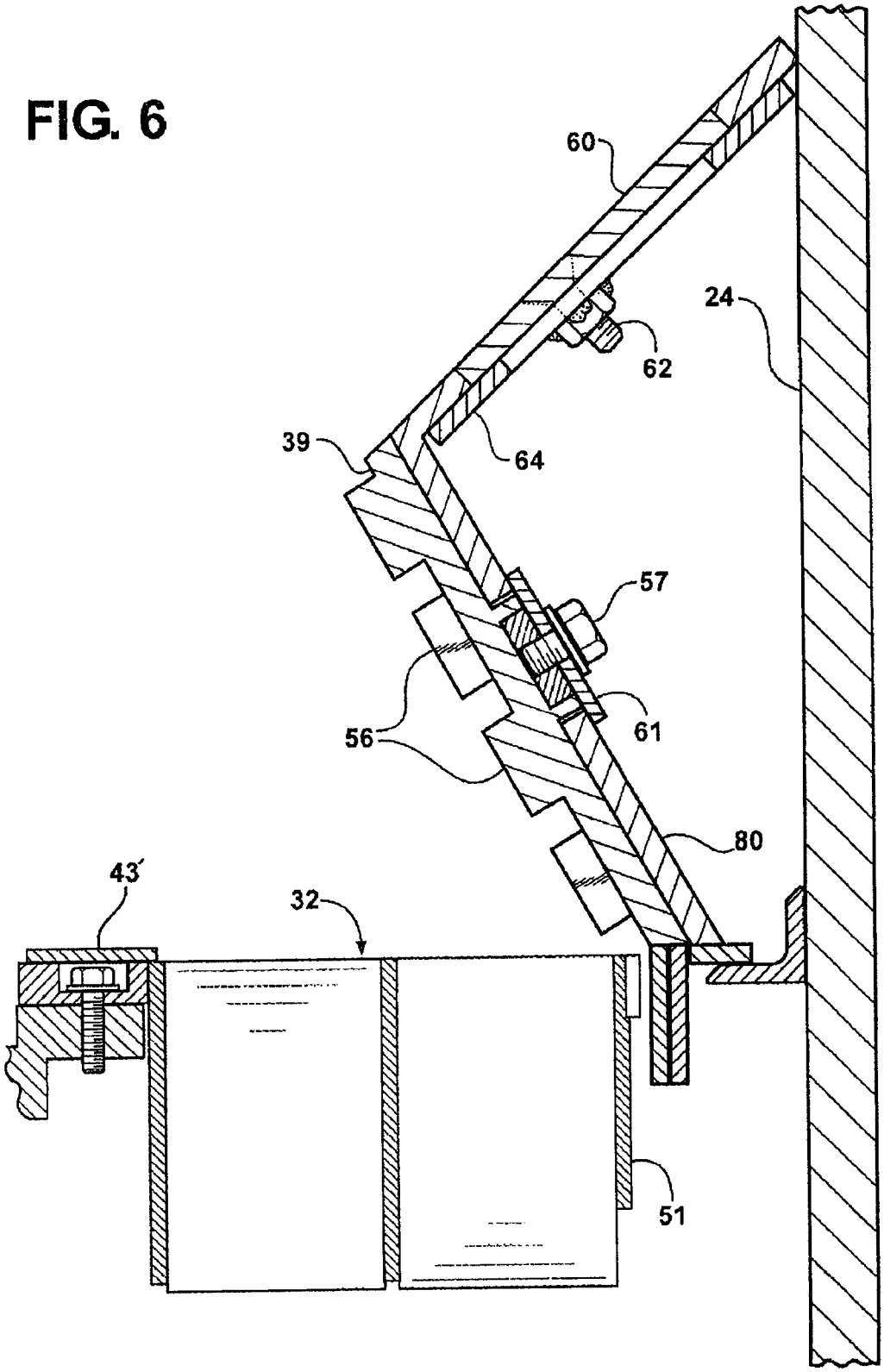
FIG. 6 is a sectional view of one illustrative vane and deflector structure including an attachment scheme. These figures are not to scale in all respects.

Referring to FIG. 6 the deflector plate 39 with surface irregularities is held to a base plate 80 by bolt/nut fasteners 57 and backing plates 61. Recess panels 60 above the deflector is held in place by bolts 62 and backing plates 64. An alternative cap plate 43' on the vane structure 32 conceals and protects the fasteners underneath.

The structures 38, 39, 56 and 88 can be cast from alloy steel, with some chromium and molybdenum content. The bolt-on plates can be made of materials such as tungsten carbide, aluminum oxide and hardened steel.

What is claimed is:

1. For use in an updraft pulverizing mill having an annular vane structure arranged about a vertical axis and adjacent a milling surface for the passage of air aiding a particle size separation function:

a deflector structure having an annular impingement surface which, in use, concentrically surrounds said axis and *at least part of which* angles inwardly toward said axis such that said updraft air impinges on said impingement surface; and a pattern of discrete, spaced apart geometric figures formed on said [surface] *structure* which *figures* tend to prevent straight-line flow of said air over said surface and between said figures.

2. The deflector structure of claim 1 wherein said irregularities include raised, spaced apart polyhedrons.

3. The deflector structure of claim 2 wherein at least some of said polyhedrons are generally rectangular.

4. The deflector structure of claim 3 wherein said generally rectangular geometric figures are arranged in staggered rows.

5. The deflector structure of claim 1 wherein said irregularities are cast integrally with said deflector structure.

6. The deflector structure of claim 1 wherein said include discrete, spaced apart geometrically shaped recesses formed in said surface.

7. The deflector structure as defined in claim 6 wherein at least some of said recesses are rectangular.

8. The deflector structure of claim 6 wherein the surface irregularities are cast into said surface.

9. A pulverizing mill comprising:

a housing having an interior wall surface;

a milling bowl within the housing;

an annular vane structure adjacent the outer periphery of said milling bowl;

[an inwardly angled] *a* deflector structure mounted on said interior wall surface proximate and above the vane structure and having [an inwardly-angled] *a* deflection surface arranged such that air passing through said vane structure impinges upon said deflection surface and is deflected [inwardly toward the center of the housing] *thereby*;

wherein *at least part of* said surface is characterized by a pattern of raised surface irregularities in the form of discrete geometric figures which are arranged in a [vertically] staggered pattern to prevent straight-line flow of said air thereover and therethrough.

10. A pulverizing mill as defined in claim 9 wherein the deflector is annular and made in arcuate segments.

11. A pulverizing mill as defined in claim 10 wherein the deflector structure comprises the combination of a base structure and plates mounted to the base structure, said surface irregularities being formed in said plates.

12. A milling structure as defined in claim 11 wherein the plates are attached to the base structures by threaded fasteners.

13. A milling structure as defined in claim 9 wherein the milling bowl is mounted for rotation.

14. A pulverizing mill as defined in claim 13 wherein the vane structure is attached to the milling bowl.

15. A pulverizing mill as defined in claim 9 wherein the vane structure includes two concentric courses of angled vanes.

*16. A pulverizing mill comprising:*

*a housing having an interior wall surface;*

*a milling bowl within the housing;*

*an annular vane structure adjacent the outer periphery of the bowl for directing air upwardly;*

*a deflector structure arranged above and around the vane structure such that air directed upwardly impinges upon the deflector structure; wherein the deflector structure presents to the impinging air and annular surface having formed thereon a pattern of raised geometric figures arranged in a fashion that prevents straight-line flow of air therethrough.*

* * * * *